(12) United States Patent
Maeda

(10) Patent No.: US 9,761,203 B2
(45) Date of Patent: Sep. 12, 2017

(54) SEMICONDUCTOR DEVICE, VIDEO DISPLAY SYSTEM, AND METHOD OF PROCESSING SIGNAL

(71) Applicant: LAPIS SEMICONDUCTOR CO., LTD., Kanagawa (JP)

(72) Inventor: Shusaku Maeda, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 417 days.

(21) Appl. No.: 14/534,240

(22) Filed: Nov. 6, 2014

(65) Prior Publication Data

US 2015/0145998 A1 May 28, 2015

(30) Foreign Application Priority Data

Nov. 28, 2013 (JP) ................................ 2013-246625

(51) Int. Cl.
*G09G 5/36* (2006.01)
*G06F 3/14* (2006.01)
*G09G 5/18* (2006.01)

(52) U.S. Cl.
CPC ................ *G09G 5/36* (2013.01); *G06F 3/14* (2013.01); *G09G 5/18* (2013.01); *G09G 2330/06* (2013.01); *G09G 2340/0407* (2013.01); *G09G 2370/20* (2013.01)

(58) Field of Classification Search
CPC .... G09G 5/36; G09G 5/18; G09G 2340/0407; G09G 2370/20; G09G 2330/06; G06F 3/14
See application file for complete search history.

(56) References Cited

U.S. PATENT DOCUMENTS 7,317,359 B2 * 1/2008 Scuteri ...................... H03L 7/06
331/1 A

FOREIGN PATENT DOCUMENTS

JP 2003-150143 A 5/2003

* cited by examiner

*Primary Examiner* — Nam Pham
(74) *Attorney, Agent, or Firm* — Kubotera & Associates, LLC

(57) ABSTRACT

A semiconductor device includes a first input unit; a second input unit; a first processing unit configured to perform a frequency dispersion processing on a first signal and a second signal; a first output unit configured to output one of the first signal and the second signal or one of the first signal and the second signal on which the first processing unit performs the frequency dispersion processing; a third input unit configured to receive a third signal generated through performing a predetermined image processing with an image processing unit on one of the first signal and the second signal; a second processing unit performing the frequency dispersion processing on the third signal; and a second output unit configured to output an output signal selected from one of the first signal, the second signal, and the third signal.

9 Claims, 7 Drawing Sheets

SEMICONDUCTOR DEVICE, VIDEO DISPLAY SYSTEM, AND METHOD OF PROCESSING SIGNAL

BACKGROUND OF THE INVENTION AND RELATED ART STATEMENT

The present invention relates to a semiconductor device, a video display system, and a method of processing a signal.

Recently, a conventional semiconductor device has been used as a controller for displaying an image such as a video image on a display unit such as a display panel. In the conventional semiconductor device, signals having different frequencies are input thereto as a signal for displaying the image on the display unit. For example, in a conventional vehicle mount video system, the conventional semiconductor device is configured to receive signals having different frequencies from various devices including a camera (a monitor) such as a backup camera for smooth parking, a car navigation device connected to a smartphone, and the like.

In the conventional vehicle mount video system, it may be configured to reduce EMI (Electro Magnetic Interference). For example, Patent Reference has disclosed a conventional vehicle mount video system provided with a PLL with a frequency dispersion function as a system clock, thereby reducing EMI.

Patent Reference: Japanese Patent. Publication No. 2003-150143

In the conventional vehicle mount video system disclosed in Patent Reference, when the signals are input from the backup camera, the device, and the like, a processing unit such as a CPU (Central Processing Unit) disposed outside the conventional vehicle mount video system performs specific image processing on the signals, so that an image is displayed on the display unit. In this case, the conventional vehicle mount video system receives the signals on which the processing unit such as the CPU disposed outside the conventional vehicle mount video system performs the specific image processing.

As described above, the conventional vehicle mount video system receives the various signals. In some occasion, the signals may be displayed on the display unit without the frequency dispersion processing. For example, in the conventional vehicle mount video system disclosed in Patent Reference, an analog signal is displayed on the display unit without the frequency dispersion processing. Accordingly, it is difficult to sufficiently reduce EMI.

In view of the problems of the conventional semiconductor device described above, an object of the present invention is to provide a semiconductor device, a video display system, and a method of processing a signal capable of sufficiently reducing EMI regardless of a type of input signal.

Further objects and advantages of the invention will be apparent from the following description of the invention.

SUMMARY OF THE INVENTION

In order to attain the objects described above, according to a first aspect of the present invention, a semiconductor device includes a first input unit for receiving a first signal; a second input unit for receiving a second signal; a first processing unit; a first output unit; a third input unit; a second processing unit; and a second output unit.

According to the first aspect of the present invention, in the semiconductor device, the first processing unit is configured to selectively perform a frequency dispersion processing on the first signal and the second signal input from the first input unit and the second input unit. The first output unit is configured to output one of the first signal and the second signal or one of the first signal and the second signal on which the first processing unit performs the frequency dispersion processing.

According to the first aspect of the present invention, in the semiconductor device, the third input unit is configured to receive a third signal generated through performing a predetermined image processing with an image processing unit on one of the first signal and the second signal output from the first output unit. The second processing unit is configured to perform the frequency dispersion processing on the third signal input from the third input unit. The second output unit is configured to output an output signal selected from one of the first signal and the second signal on which the first processing unit performs the frequency dispersion processing or the third signal on which the second processing unit performs the frequency dispersion processing to a display unit.

According to a second aspect of the present invention, a video display system includes the image processing unit for performing the specific image processing; the semiconductor device in the first aspect of the present invention; and the display unit for displaying an image according to the output signal output from the second output unit of the semiconductor device.

According to a third aspect of the present invention, a method of processing a signal includes the steps of performing selectively a frequency dispersion processing with a first processing unit on a first signal input from a first input unit and a second signal input from a second input unit; and outputting one of the first signal and the second signal or one of the first signal and the second signal on which the first processing unit performs the frequency dispersion processing with a first output unit.

According to the third aspect of the present invention, in the semiconductor device, the method of processing a signal further includes the steps of receiving a third signal generated through performing a predetermined image processing with an image processing unit on one of the first signal and the second signal output from the first output unit with a third input unit; performing the frequency dispersion processing on the third signal input from the third input unit with a second processing unit; and outputting an output signal selected from one of the first signal and the second signal on which the first processing unit performs the frequency dispersion processing or the third signal on which the second processing unit performs the frequency dispersion processing with a second output unit to a display unit.

According to the present invention, it is possible to sufficiently reduce EMI regardless of a type of input signal.

BRIEF DESCRIPTION OF TEE DRAWINGS

Figure 6:
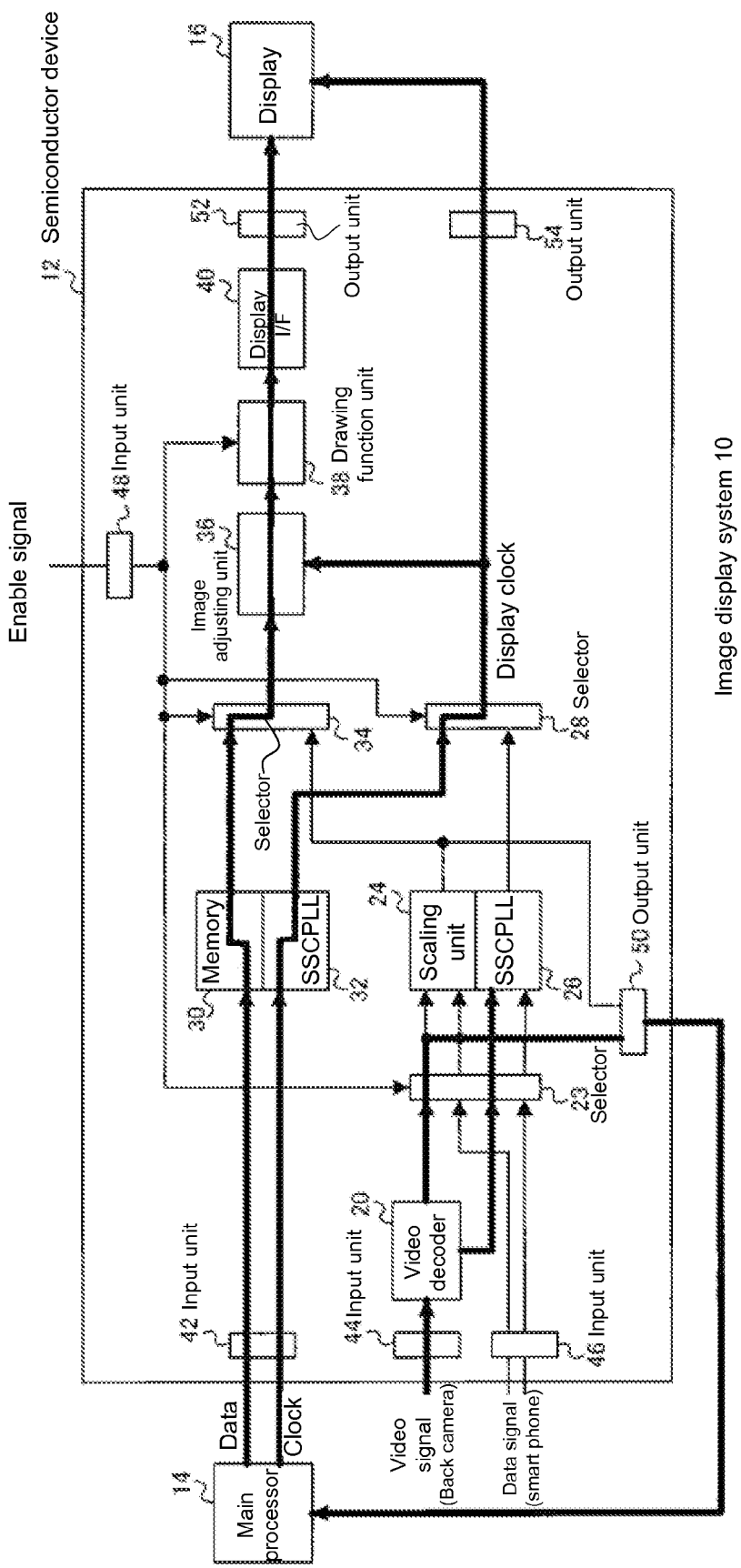
Figure 7:
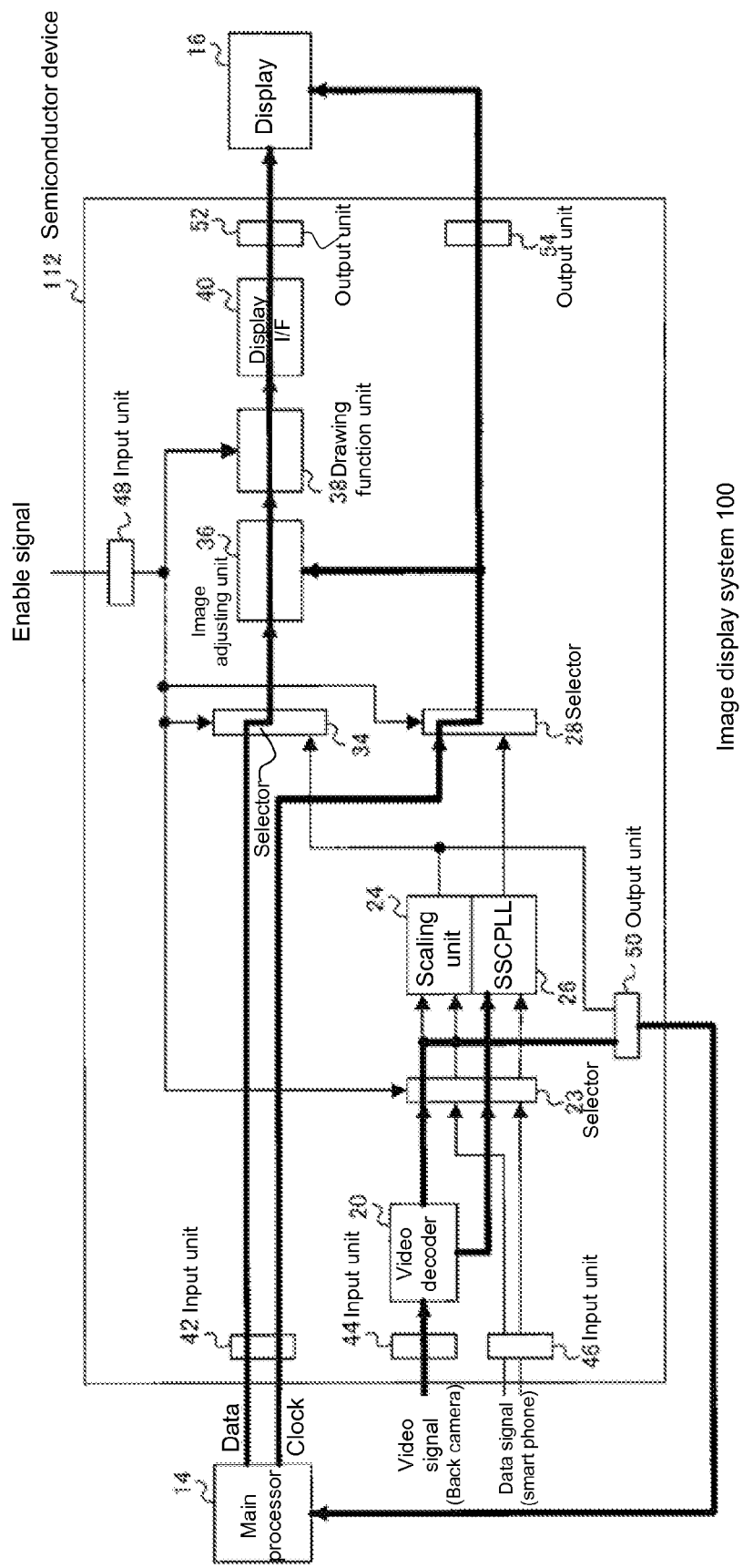

FIG. 6 is a block diagram showing a signal path No. 2 of the video display system when the enable signal is a type B (in which a video signal directly input from any vehicle mount camera is displayed on the display unit after a main processor performs an image processing on the video signal) according to the embodiment of the present invention; and FIG. 7 is a block diagram showing a signal path of a conventional video display system when an enable signal is the type B (in which a video signal directly input from any vehicle mount camera is displayed on a display unit after a main processor performs an image processing on the video signal).

DETAILED DESCRIPTION OF PREFERRED EMBODIMENTS

Hereunder, preferred embodiments of the present invention will be explained with reference to the accompanying drawings.

In the following description, the present invention is applied to a video display system, in which a vehicle mount camera captures a video signal, so that the video signal is displayed on a display unit. More specifically, as an actual example of the embodiment, the present invention is applied to a video display system, in which, when a vehicle moves backward (in particular, the vehicle is set in a back gear), an image captured with a back camera of the vehicle is displayed on the display unit at a high speed, so that an operator of the vehicle can see the image on the display unit.

Figure 1:
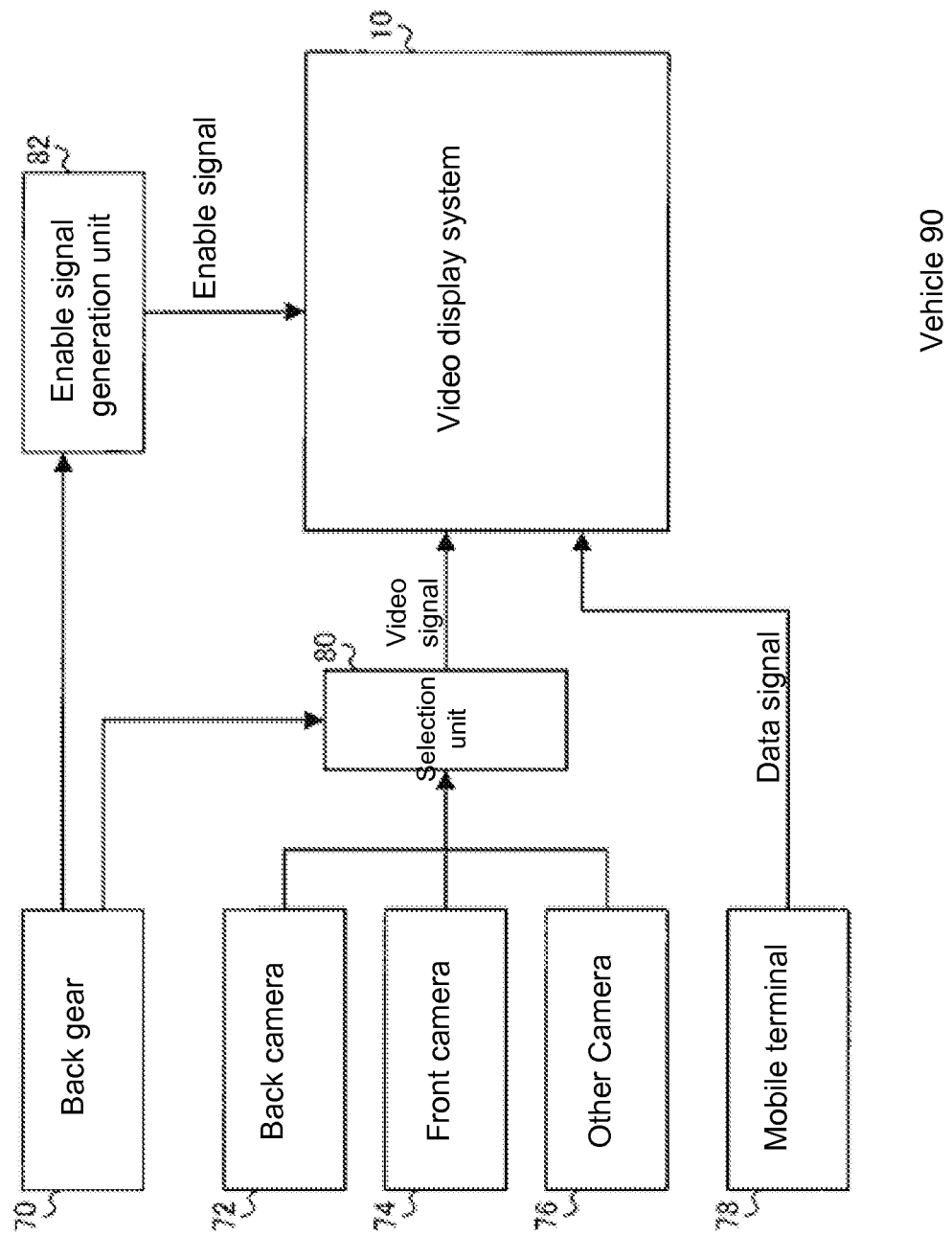
FIG. 1 is a block diagram showing a configuration of a vehicle provided with a video display system according to an embodiment of the present invention.

FIG. 1 is a block diagram showing a configuration of a vehicle 90 provided with a video display system 10 according to the embodiment of the present invention.

As shown in FIG. 1, the vehicle 90 is provided with a back camera 72; a front camera 74; and other camera 76. It should be noted that the back camera 72, the front camera 74, and the other camera 76 mounted on the vehicle 90 are not specifically limited to any particular ones, and it is suffice that at least the vehicle 90 is provided with the back camera 72 for capturing an image of a backside of the vehicle 90. For example, the vehicle 90 may be provided with an around view monitor. It should be noted that the back camera 72, the front camera 74, and the other camera 76 may be collectively referred to as vehicle mount cameras.

In the embodiment, the back camera 72, the front camera 74, and the other camera 76 may be configured to start through performing an arbitrary process. For example, the back camera 72, the front camera 74, and the other camera 76 may be started when the vehicle 90 is started, or an operator of the vehicle 90 may be able to instruct the back camera 72, the front camera 74, and the other camera 76 to start. As described above, the video display system 10 is configured such that when the vehicle 90 moves backward, an image from the back camera 72 is displayed on the display unit at a high speed. Accordingly, it is preferred that the back camera 72 is started at the same time when the vehicle 90 is started, or the back camera 72 is started together with a back gear 70.

In the embodiment, the vehicle 90 further includes a selection unit 80. The selection unit 80 has a function of outputting a video signal selected from video signals output from the back camera 72, the front camera 74, and the other camera 76 according to a predetermined condition to the video display system 10. In the vehicle 90, the selection unit 80 is synchronized with the back gear 70. More specifically, when the back gear 70 is set, the selection unit 80 selects the video signal output from the back camera. 72, and outputs the video signal to the video display system 10.

In the embodiment, the vehicle 90 further includes an enable signal generation unit 82. The enable signal generation unit 82 is configured to generate and output an enable signal for controlling a path (a signal path) of a semiconductor device 12 of the video display system 10. In the vehicle 90, the enable signal generation unit 82 is synchronized with the back gear 70. More specifically, when the back gear 70 is set, the enable signal generation unit 82 outputs the enable signal (a type A, described later) to the video display system 10, so that the video signal input from the back camera 72 is selected and displayed on the display unit.

In the embodiment, the video display system 10 is configured to receive a data signal output from a mobile terminal 78 of the operator through HDMI (registered trade mark, High-Definition Multimedia Interface). It should be noted that the data signal output from the mobile terminal 78 may include a video signal. In the following description, the signal output from the mobile terminal 78 is referred to as the data signal to differentiate from the video signal output from the vehicle mount camera.

In the embodiment, the mobile terminal. 78 may include, for example, a smartphone, a tablet device, and the like. It should be noted that it is not limited to the mobile terminal 78, and may be a car navigation system, a DVD player, a communication device, a network device, and the like. In the following description, the mobile terminal 78 is the smartphone as an example.

Figure 2:
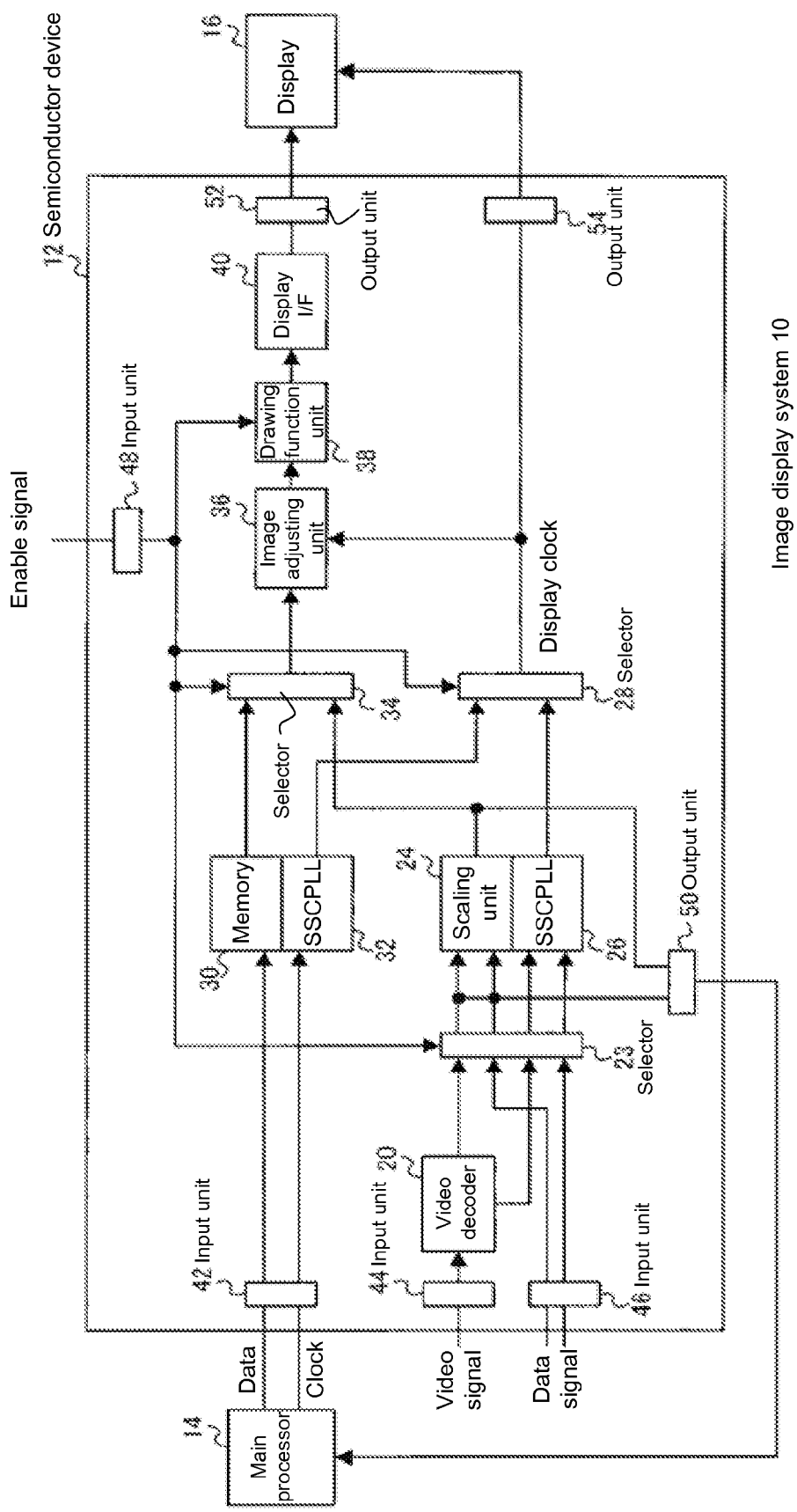
FIG. 2 is a block diagram showing a configuration of the video display system according to the embodiment of the present invention.

A configuration of the video display system 10 will be explained next. FIG. 2 is a block diagram showing the configuration of the video display system 10 according to the embodiment of the present invention.

As shown in FIG. 2, the video display system 10 includes the semiconductor device 12; a main processor 14; and a display 16. It should be noted that the display 16 is an example of the display unit.

In the embodiment, the main processor 14 is constituted as an SoC (System on a Chip), and has a function of performing a predetermined image processing. The predetermined image processing may include, for example, an image processing of combining a menu screen, map information, a text, and the like relative to an input video signal and an input data signal. Accordingly, the digital data signal output from the main processor 14 is scaled according to a size of the display 16. Further, the main processor 14 is configured to output the digital data signal with the image processing performed thereon and a data clock to the semiconductor device 12.

As shown in FIG. 2, the semiconductor device 12 includes a video decoder 20; a selector 23; a scaling unit. 24; a frequency dispersion function PLL (referred to as an SSC-PLL) 26; a selector 28; a memory 30; an SSCPLL 32; a selector 34; an image adjusting unit 36; a drawing function unit 38; a display interface (I/F) unit 40; an input unit 42; an input unit 44; an input unit 46; an input unit 48; an output unit 50; an output unit 52; and an output unit 54.

In the embodiment, the SSCPLL, 26 is an example of a first processing unit; the SSCPLL 32 is an example of a second processing unit; the selector 34 is an example of a selecting unit; the input unit 44 is an example of a first input unit; the input unit 46 is an example of a second input unit; the input unit 42 is an example of a third input unit; the output unit 50 is an example of a first output unit; and the output unit 54 is an example of a second output unit.

In the embodiment, the input unit. 48 is configured to receive the enable signal. The enable signal input into the input unit 48 is output to the selector 23, the selector 28, the selector 34, and the drawing function unit 38, so that the enable signal functions as a control signal for controlling each component. Further, the enable signal controls the selector 23 to select one of the video signal and the data signal.

Further, the enable signal controls the selector 28 to select one of a clock output from the SSCPLL 26 and a clock output from the SSCPLL 32. Similarly, the enable signal controls the selector 34 to select a signal output from the scaling unit 24 and a digital signal output from the memory 30. In other words, the selector 28 and the selector 34 are configured to select then of the signal input from the main processor 14 and the signal not passing through the main processor 14 (input directly).

In the embodiment, the enable signal is categorized into the following four kinds (types) according to ways of controlling the components. When the enable signal is a type A, the selector 23 selects the video signal, and further the selector 28 selects the clock directly input. When the enable signal is a type B, the selector 23 selects the video signal, and further the selector 28 selects the clock input from the main processor 14. When the enable signal is a type C, the selector 23 selects the data signal, and further the selector 28 selects the clock directly input. When the enable signal is a type D, the selector 23 selects the data signal, and further the selector 28 selects the clock input from the main processor 14.

In the embodiment, the input unit. 44 is configured to receive the video signal output from the vehicle mount cameras. The video signal input into the input unit 44 is output to the video decoder 20. The video decoder 20 has a function of converting the video signal into digital data. Further, the video decoder 20 outputs the video signal thus decoded and a decoder clock to the selector 23.

In the embodiment, the input unit 46 is configured to receive the data signal and a data clock output from the mobile terminal 78 (the smartphone). The data signal input into the input unit 46 is output to the selector 23.

In the embodiment, the selector 23 is configured to select and output the signal to the scaling unit. 24 and the SSCPLL 26 according to the enable signal. As an example, the selector 23, the selector 28, and the selector 34 may be formed of a multiplexer.

In the embodiment, when the enable signal is the type A or the type B, the selector 23 selects the video signal output from the video decoder 20, and outputs the video signal to the scaling unit 24 and the output unit 50. Further, the selector 23 selects the decoder clock output from the video decoder 20, and outputs the decoder clock to the SSCPLL 26. On the other hand, when the enable signal is the type C or the type D, the selector 23 selects the video signal output from the mobile terminal 78 (the smartphone), and outputs the video signal to the scaling unit. 24 and the output unit 50. Further, the selector 23 selects the data clock output from the mobile terminal. 78 (the smartphone), and outputs the data clock to the SSCPLL 26.

In the embodiment, the SSCPLL 26 has a function of generating a display clock to be output to the display 16 from the decoder clock output from the video decoder 20 and the data clock input from the mobile terminal. 78 (the smartphone). Further, the SSCPLL 26 has a function of applying minute modulation on a frequency of the decoder clock output from the video decoder 20 and the data clock input from the mobile terminal 78 (the smartphone), so that a spectrum of the display clock is dispersed and a peak value of EMI is reduced. It should be noted that the display clock generated and having the frequency dispersed with the SSCPLL 26 is output to the selector 28.

In the embodiment, the SSCPLL 26 includes registers for storing values corresponding to the frequencies of the various signals input thereto. Accordingly, the SSCPLL 26 is configured to select one of the registers according to the various signals thus input, and to perform the frequency dispersion processing using the value stored in the selected one of the registers. It should be noted that the SSCPLL 26 is configured to select one of the registers with an arbitrary method. For example, the SSCPLL 26 may be configured to select one of the registers according to the enable signal, or synchronizing with the selector 23. It should be also noted that the SSCPLL, 26 may be configured as a hardware resource or software.

In the embodiment, the scaling unit. 24 has a function of performing a scaling (reduction or enlargement according to a display area) according to a size of the display 16. After the scaling unit 24 performs the scaling on the video signal or the data signal, the video signal or the data signal is output to the selector 34 and the output unit 50.

In the embodiment, the output unit 50 is configured to output one of the signal output from the selector 23 and the signal output from the scaling unit 24. It may be configured to select one of the signal output from the selector 23 and the signal output from the scaling unit 24, for example, through a predetermined process according to the function of the main processor 14, or according to a control signal input externally.

In the embodiment, the main processor 14 has the scaling function. Accordingly, the output unit 50 outputs the signal (the video signal or the data signal) output from the selector 23 before the main processor 14 performs the scaling. It should be noted that, if the main processor 14 does not have the scaling function, the output unit 50 may be configured to output the signal (the video signal or the data signal) output from the scaling unit 24. The signal (the video signal or the data signal) output from the output unit 50 is input into the main processor 14 through outside the semiconductor device 12.

In the embodiment, the input unit. 42 is configured to receive the data signal and the clock from the main processor 14. The data signal input into the input unit 42 is output to the memory 30. Further, the clock input into the input unit 42 is output to the SSCPLL 32.

In the embodiment, the semiconductor device 12 does not use the clock input from the main processor 14 as the display clock as is, but changes to the display clock generated with the SSCPLL 32. The memory 30 has a function of storing data input from the main processor 14, so that a difference in the frequencies due to the change of the clock is absorbed. The data signal output from the memory 30 is output to the selector 34.

In the embodiment, similar to the SSCPLL 26, the image adjusting unit 36 has the function of performing the frequency dispersion processing on the frequency of the clock, thereby reducing EMI. The display clock output from the SSCPLL 32 is output to the selector 28.

As described above, the selector 28 has the function of selecting one of the display clock output from the SSCPLL 26 and the display clock output from the SSCPLL 32 according to the enable signal, and outputting the selected display clock to the image adjusting unit 36 and the output unit 54. The display clock output from the selector 28 is output to the display 16 through the output unit 54.

As described above, the selector 34 has the function of selecting one of the video signal or the data signal output from the scaling unit 24 and the data signal output from the memory 30 as the output signal according to the enable signal, and outputting the output signal to the image adjusting unit 36.

In the embodiment, the image adjusting unit 36 has a function of adjusting image quality of the image to be displayed on the display 16 such as brightness and color according to the output signal.

In the embodiment, the drawing function unit 38 has a function of performing a predetermined drawing processing on the image to be displayed on the display 16 according to the enable signal. More specifically, the drawing function unit 38 performs the drawing processing relative to the output signal based on the video signal directly input from the back camera 72 when the vehicle 90 is the back gear, and does not perform the drawing processing in other cases. Accordingly, when the enable signal is the type A, the drawing function unit 38 outputs the output signal input from the image adjusting unit 36 after the drawing processing. On the other hand, when the enable signal is the type B, the type C, or the type D, the drawing function unit 38 outputs the output signal input from the image adjusting unit 36 as is.

In the embodiment, when the image based on the video signal directly input from the back camera 72, that is, the video image captured with the back camera 72, is displayed on the display 16 as is, an operator (a driver) may have hard time to recognize a location and a status of the vehicle 90. For this reason, when the image based on the video signal directly input from the back camera 72 is displayed on the display 16 as is, the drawing function unit 38 performs the drawing processing such as adding a headline or a text for prompting the driver to pay attention. It should be noted that the drawing function unit. 38 performs the drawing processing that is simpler than the image processing performed with the main processor 14. Accordingly, the drawing function unit 38 may be configured as a hardware resource or software. When the drawing function unit 38 is configured as the hardware resource, the drawing function unit 38 may be formed of a simple configuration without a CPU and the like.

An operation of the video display system 10 will be explained next. As described above, the semiconductor device 12 of the video display system 10 operates according to the enable signal. In other words, the semiconductor device 12 is configured such that a path through which various signals pass is determined according to the enable signal.

Figure 3:
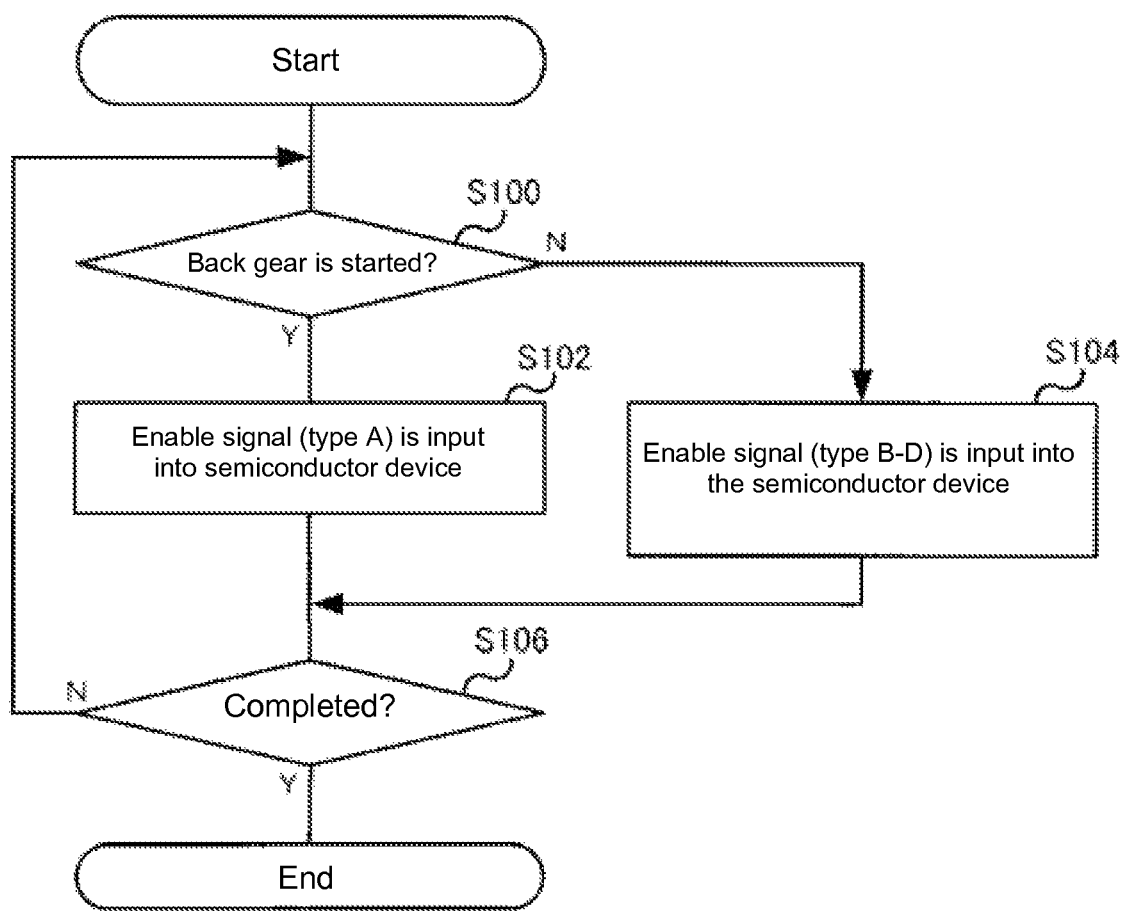
FIG. 3 is a flow chart showing an operation of the video display system in which an enable signal is input into a semiconductor device of the video display system according to the embodiment of the present invention.

First, a flow of inputting the enable signal into the semiconductor device 12 of the video display system 10 in the vehicle 90. FIG. 3 is a flow chart showing the operation of the video display system 10 in which the enable signal is input into the semiconductor device 12 of the video display system 10 according to the embodiment of the present invention. It should be noted that the operation shown in FIG. 3 is started when, for example, the vehicle 90 is started.

In step S100, it is determined whether the back gear 70 is started. When it is determined that the back gear 70 is started (Y in step S100), the enable signal generation unit 82 generates the enable signal of the type A associated with the start up of the back gear 70. In step S102, the enable signal of the type A thus generated is input into the semiconductor device 12.

On the other hand, when it is determined that the back gear 70 is not started (N in step S100), the enable signal generation unit 82 generates the enable signal of the type B, the type C, or the type D depending on the condition defined in advance. In step S104, the enable signal of the type B, the type C, or the type D thus generated is input into the semiconductor device 12.

In the embodiment, only when the back gear 70 is started, the enable signal generation unit. 82 generates the enable signal of the type A. Alternatively, it may be configured such that the enable signal generation unit 82 generates the enable signal of the type A in other cases. For example, it may be configured such that when the video signal or the data signal thus input is displayed on the display 16 at a higher speed, or the video signal or the data signal thus input is displayed on the display 16 without the image processing at the main processor 14, the enable signal of the type A may be input into the semiconductor device 12.

In step S106, it is determined that the process is completed. When it is determined that the process is not completed (N in step S106), the enable signal generation unit 82 repeatedly generates the enable signal, so that the enable signal is repeatedly input into the semiconductor device 12 of the video display system 10. When the predetermined condition is met, for example, the vehicle 90 is terminated, it is determined that the process is completed (Y in step S106).

Figure 4:
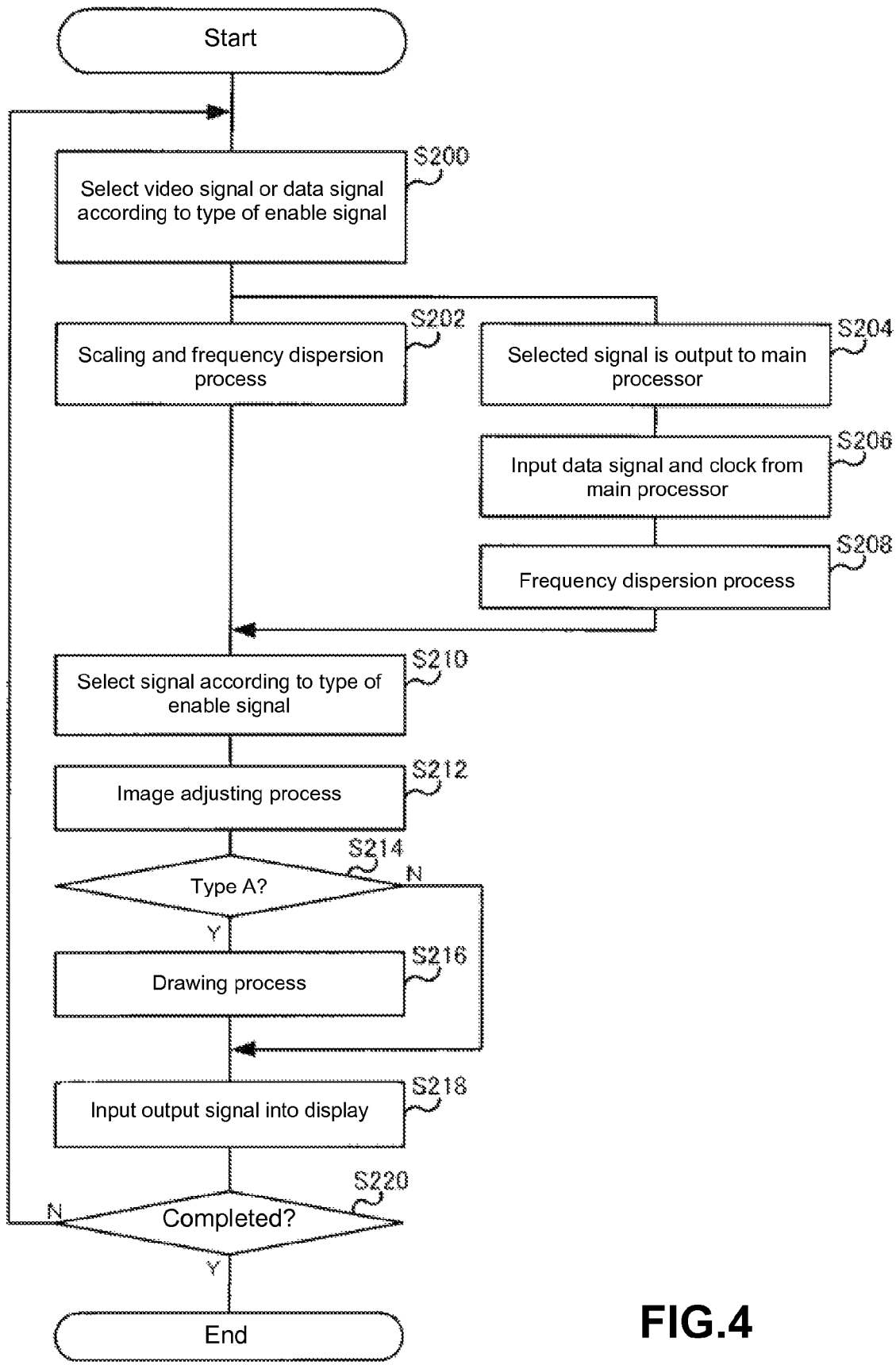
FIG. 4 is a flow chart showing an operation of the video display system in which a video signal and a data signal are displayed as an output signal on a display unit of the video display system according to the embodiment of the present invention.

An operation of the video display system 10 for outputting the video signal and the data signal thus input to the display 16 as the output signal will be explained next. FIG. 4 is a flow chart showing the operation of the video display system 10 in which the video signal and the data signal are displayed as the output signal on the display unit 16 of the video display system 10 according to the embodiment of the present invention.

In the embodiment, the operation shown in FIG. 4 is started when, for example, the video display system 10 or the semiconductor device 12 is started. It may be configured such that the start of the video display system 10 (or the semiconductor device 12) is synchronized with the start of the vehicle 90, or the video display system 10 (or the semiconductor device 12) is started according to an instruction of an operator from a car navigation system and the like. It should be noted that, in the embodiment, it is preferred that the start of the video display system 10 (or the semiconductor device 12) is synchronized with the start of the vehicle 90 or the start of the back gear 70, so that the image of the back camera 72 is displayed on the display 16 at a higher speed when the back gear 70 is set. At least, it is preferred that the start of the video display system 10 (or the semiconductor device 12) is synchronized with the start of the back gear 70.

In the embodiment, after the video signal is input into the video display system 10 through the input unit 44, the video decoder 20 decodes the video signal. Then, the video signal thus decoded and the decoder clock are input into the selector 23. Further, the data signal input through the input unit 46 and the data clock are input into the selector 23.

In step S200, when the enable signal is input into the input unit 48, the selector 23 selects the video signal and the decoder clock or the data signal and the data clock according to the type of the enable signal, and outputs the selected ones to the scaling unit 24 and the SSCPLL 26.

In the embodiment, the video display system 10 is configured such that the selector 23 outputs the video signal or the data signal thus selected to both the scaling unit 24 and the output unit 50 regardless of the type of the enable signal. When the enable signal is the type A or the type C, the video signal or the data signal output to the scaling unit 24 becomes the output signal. When the enable signal is the type B or the type D, the video signal or the data signal output to the output unit 50 becomes the output signal.

Figure 5:
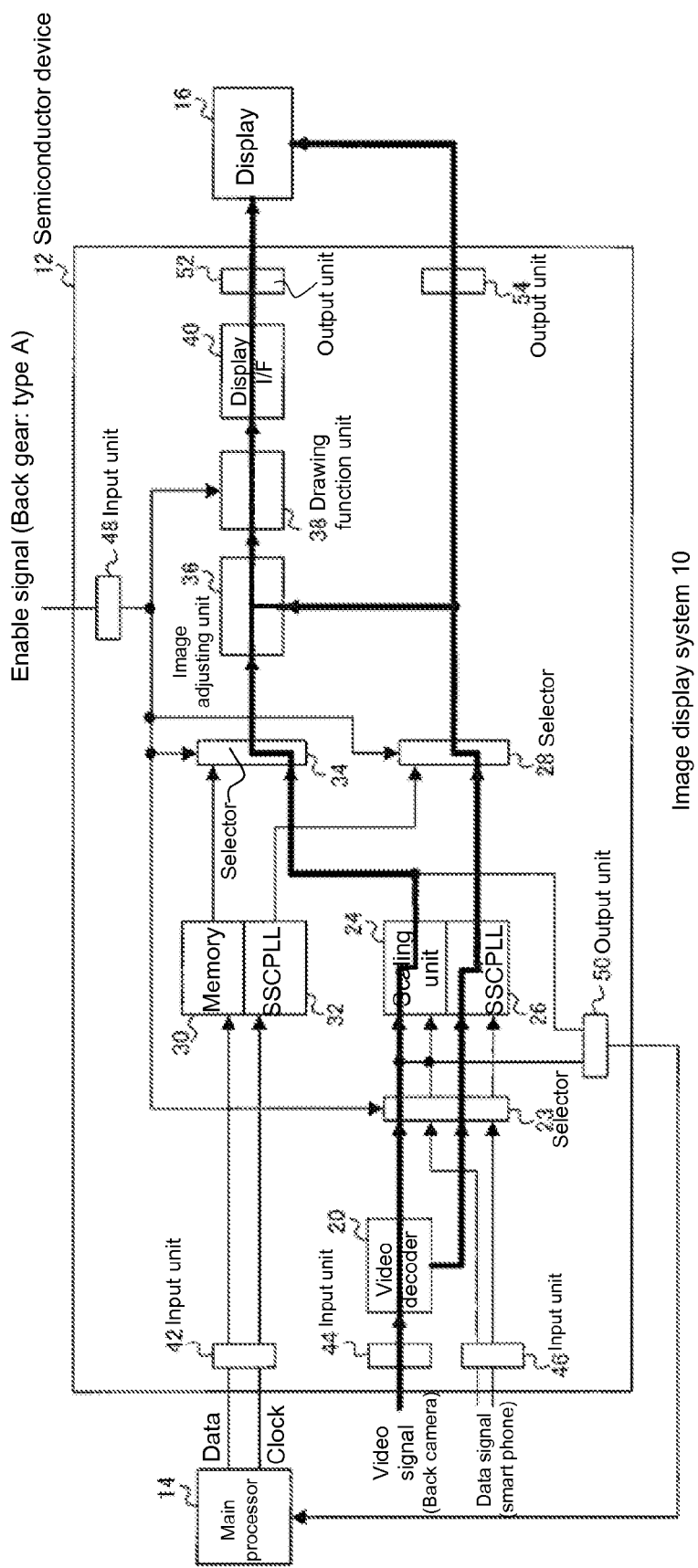
FIG. 5 is a block diagram showing a signal path No. 1 of the video display system when the enable signal is a type A (in which a video signal directly input from a back camera is displayed on the display unit) according to the embodiment of the present invention.

In the following description, various signal paths through which the signals pass will be explained. FIG. 5 is a block diagram showing a signal path No. 1 of the video display system 10 when the enable signal is the type A (in which the video signal directly input from the back camera 72 is displayed on the display unit 16) according to the embodiment of the present invention. As described above, when the enable signal is the type A, the output signal based on the video signal output into the scaling unit 24 and the decoder signal output into the SSCPLL 26 are displayed on the display 16.

In step S202, the scaling unit 24 performs the scaling relative to the video signal input thereto according to the size of the display 16 to generate the output signal, and outputs the output signal to the selector 34. Further, the scaling unit 24 performs the frequency dispersion process relative to the decoder clock input thereto according to the frequency of the decoder clock, and outputs the decoder clock to the selector 28.

In step S210, the selector 28 selects the decoder clock output from the SSCPLL 26 as the display clock according to the type of the enable signal, and outputs the display clock thus selected to the display 16 through the output unit 54. Further, the selector 34 selects the video signal output from the scaling unit 24 as the output signal according to the type of the enable signal, and outputs the output signal thus selected to the image adjusting unit 36.

In step S212, the image adjusting unit 36 performs the image adjustment process relative to the output signal (the video signal) thus input, and outputs the output signal (the video signal) to the drawing function unit 38.

In step S214, it is determined whether the enable signal is the type A. In step S216, when it is determined that the enable signal is the type A (Y in step S214), the drawing function unit 38 performs the drawing processing. In step S218, the drawing function unit 38 outputs the output signal (the video signal) with the drawing processing performed thereon to the display 16 through the display interface (I/F) unit 40 and the output unit 52.

As described above, when the enable signal is the type A, the video signal of the back camera 72 is input into the display 16 as the output signal. Further, the display clock with the frequency dispersion process performed thereon with the SSCPLL 26 is input into the display 16 through the output unit 54.

In the embodiment, when the enable signal is the type C, it is determined that the enable signal is not the type A (N in step S214), and the process proceeds to step S218. Accordingly, the drawing function unit. 38 does not perform the drawing processing, and the selector 23 selects the data signal and the data clock input from the mobile terminal 78 (the smartphone) through the input unit 46. It should be noted that other part of the signal path of the type C is similar to that of the type A. Accordingly, the data signal of the mobile terminal 78 (the smartphone) is input into the display 16 as the output signal through the output unit 52. Further, the display clock with the frequency dispersion process performed thereon with the SSCPLL 26 is input into the display 16 through the output unit 54.

On the other hand, when the enable signal is the type B or the type D, the data signal output to the output unit 50 is input into the main processor 14.

FIG. 6 is a block diagram showing a signal path No. 2 of the video display system 10 when the enable signal is the type B (in which the video signal directly input from any vehicle mount camera is displayed on the display unit 16 after the main processor 14 performs the image processing on the video signal) according to the embodiment of the present invention.

In step S204, the signal selected with the selector 23 is output to the main processor 14. When the enable signal is the type B, the video signal is output to the main processor 14. Afterward, the main processor 14 performs the image process determined in advance relative to the video signal thus input, and performs the scaling to generate the data signal. In step S206, the data signal generated with the main processor 14 and the clock are input into the semiconductor device 12 through the input unit 42. It should be noted that the clock input into the semiconductor device 12 is in the state that the frequency dispersion process is not performed thereon.

In the next step, the data signal is input into the memory 30. In step S208, the clock is input into the SSCPLL, 32, so that the SSCPLL 32 performs the frequency dispersion process relative to the clock. Afterward, the memory 30 outputs the data signal to the selector 34, and the SSCPLL 32 outputs the display clock to the selector 28.

In step S210, the selector 28 selects the clock output from the SSCPLL 32 as the display clock, and outputs the display clock thus selected to the display 16 through the selector 34 and the output unit 54. Further, the selector 34 selects the signal (the video signal) output from the scaling unit 24 as the output signal, and outputs the output signal thus selected to the image adjusting unit 36.

In step S212, the image adjusting unit 36 performs the image adjustment process relative to the output signal (the video signal) thus input, and outputs the output signal (the video signal) to the drawing function unit 38.

In the embodiment, when the enable signal is the type B, it is determined that the enable signal is not the type A (N in step S214), and the process proceeds to step S218. Accordingly, the drawing function unit 38 does not perform the drawing processing. In step S218, the semiconductor device 12 outputs the signal (the video signal) input into the drawing function unit 38 as is to the display 16 through the display interface (I/F) unit 40 and the output unit 52.

As described above, when the enable signal is the type B, the signal (the video signal) input from the main processor 14 is input into the display 16 through the output unit 52. Further, the display clock with the frequency dispersion process performed thereon with the SSCPLL, 32 is input into the display 16 through the output unit 54.

In the embodiment, when the enable signal is the type D, different from the case of the type B, the selector 23 selects the data signal and the data clock input from the mobile terminal 78 (the smartphone) through the input unit 46. It should be noted that other part of the signal path of the type D is similar to that of the type B. Accordingly, the data signal of the mobile terminal 78 (the smartphone) input from the main processor 14 is input into the display 16 as the output signal through the output unit 52. Further, the display clock with the frequency dispersion process performed thereon with the SSCPLL 32 is input into the display 16 through the output unit 54.

In step S220, it is determined that the process is completed. When it is determined that the process is not completed (N in step S220), the above process of displaying the image according to the video signal and the data signal thus input on the display 16 is repeatedly performed. When the predetermined condition is met, for example, the vehicle 90 is terminated, it is determined that the process is completed (Y in step S220).

As described above, the video display system 10 includes the memory 30 and the SSCPLL 32. The video signal is input into the semiconductor device 12 from the vehicle mount cameras through the input unit 44, and the data signal and the data clock are input into the semiconductor device 12 from the mobile terminal 78 such as the smartphone through the input unit 46. Further, the data signal and the clock are input into the semiconductor device 12 from the main processor 14 through the input unit 42.

In the embodiment, the semiconductor device 12 outputs the output signal according to the video signal and the decoder clock input through the input unit 44, or the output signal according to the data signal and the data clock input through the input unit 46 to the display 16 without passing through the main processor 14. In this case, the semiconductor device 12 outputs the display clock with the frequency dispersion process performed thereon with the SSCPLL 26 to the display 16 through the output unit 54. Further, the semiconductor device 12 outputs the output signal according to the data signal and the clock input from the main processor 14 through the input unit 42 to the display 16. In this case, the semiconductor device 12 outputs the display clock with the frequency dispersion process performed thereon with the SSCPLL 32 to the display 16 through the output unit 54.

FIG. 7 is a block diagram showing a signal path of a conventional video display system 100 when the enable signal is the type B (in which the video signal directly input from any vehicle mount camera is displayed on a display unit after a main processor performs an image processing on the video signal).

As shown in FIG. 7, in a conventional semiconductor device 112 of the conventional video display system 100, the data signal input from the main processor 14 is input into the image adjusting unit 36 as is through the selector 34. Then, the output signal with the image adjustment process performed thereon with the image adjusting unit 36 is output to the display 16. Further, the clock input from the main processor 14 is output as is to the display 16 as the display clock through the selector 28 and the output unit 54. In other words, in the conventional semiconductor device 112, the display clock without the frequency dispersion process performed thereon is output to the display 16. Accordingly, when the data signal and the clock input from the main processor 14 is output to the display 16, it is difficult to reduce EMI.

On the other hand, as described above, in the semiconductor device 12 of the video display system 10 in the embodiment, the display clock with the frequency dispersion process performed thereon is output to the display 16, regardless of the signal (the video signal or the data signal) input from any of the input unit 42, the input unit 44, and the input unit 46. Accordingly, it is possible to reduce EMI regardless of the types of the input signals. Further, in the video display system 10, it is possible to properly reduce EMI relative to the input signals having difference frequencies.

Further, in the video display system 10 in the embodiment, when the video signal input directly from the back camera 72 is output to the display 16 (the enable signal is the type A), the output signal generated according to the video signal directly input is output to the display 16 without passing through the main processor 14. In this case, the drawing function unit 38 performs the drawing processing, and in other cases, the drawing function unit 38 does not perform the drawing processing. Accordingly, in the video display system 10 in the embodiment, when the video image captured with the back camera 72 is displayed on the display 16, it is possible to display the video image at a high speed. Further, in addition to the video image as is, it is possible to display information such as a guideline and the like to an operator (a driver).

In the embodiment, the enable signal generated outside the video display system 10 is input into the semiconductor device 12, and the present invention is not limited to outside the video display system 10. Alternatively, it may be configured such that the enable signal is generated inside. For example, according to the operation of the main processor 14, it may be configured such that the enable signal is generated with the main processor 14 or a generation unit disposed inside the video display system 10, so that the enable signal is input into the semiconductor device 12 through the input unit 48.

Further, in the embodiment, when the selector 34 selects the video signal input from the scaling unit 24, the drawing function unit 38 performs the drawing processing, and the present invention is not limited thereto. For example, when the selector 34 selects the data signal input from the scaling unit 24, the main processor 14 does not perform the image processing. Accordingly, it may be configured such that the drawing function unit 38 performs the drawing processing on the data signal as well. It should be noted that, when the selector 34 selects the video signal input from the scaling unit 24, it is preferred that the drawing function unit 38 performs the drawing processing.

Further, in the embodiment, when the back camera 72 is started, the video signal input directly from the back camera 72 without passing through the main processor 14 is output to the display 16, and the present invention is not limited thereto. Alternatively, it may be configured that the video signal is output to the display 16 synchronizing with the start of the vehicle 90 or the start of the back camera 72. Further, an operator may instruct the semiconductor device 12 to output the video signal to the display 16.

It should be noted that the type and the number of the video signal and the data signal to be input into the semiconductor device 12 are arbitrary and not limited to those in the embodiment. Similarly, the number of the input units to which the video signal and the data signal are input is arbitrary and not limited to those in the embodiment.

In the embodiment, the video display system 10 is provided for displaying the video image of the vehicle mount cameras, and the present invention is not limited thereto. The present invention may be applicable to, for example, a door phone of a general security system.

Further, it should be noted that the configurations and the operations of the video display system 10, the semiconductor device 12, and the vehicle 90 are examples, and the present invention may be modified within the scope thereof.

The disclosure of Japanese Patent Application. No. 2013-246625, filed on Nov. 28, 2013, is incorporated in the application by reference.

While the invention has been explained with reference to the specific embodiments of the invention, the explanation is illustrative and the invention is limited only by the appended claims.

What is claimed is:

1. A semiconductor device, comprising:
a first input unit for receiving a first signal;
a second input unit for receiving a second signal;
a first processing unit configured to selectively perform a frequency dispersion processing on the first signal and the second signal input;
a first output unit configured to output one of the first signal and the second signal or one of the first signal and the second signal on which the first processing unit performs the frequency dispersion processing;
a third input unit configured to receive a third signal generated through performing a predetermined image processing with an image processing unit on one of the first signal and the second signal output from the first output unit;
a second processing unit configured to perform the frequency dispersion processing on the third signal; and
a second output unit configured to output an output signal selected from one of the first signal, the second signal on which the first processing unit performs the frequency dispersion processing, and the third signal on which the second processing unit performs the frequency dispersion processing with a second output unit to a display unit.

2. The semiconductor device according to claim 1, further comprising a selection unit configured to select one of the first signal and the second signal on which the first processing unit performs the frequency dispersion processing or the third signal on which the second processing unit performs the frequency dispersion processing as the output signal according to a control signal; and
a drawing function unit configured to perform a drawing processing on the output signal according to the control signal when one of the first signal and the second signal on which the first processing unit performs the frequency dispersion processing is selected as the output signal,
wherein said second output unit is configured to output the output signal on which the drawing function unit performs the drawing processing when the selection unit selects one of the first signal and the second signal on which the first processing unit performs the frequency dispersion processing as the output signal, and
said second output unit is configured to output the output signal selected with the selection unit when the selection unit selects the third signal on which the second processing unit performs the frequency dispersion processing as the output signal.

3. The semiconductor device according to claim 2, wherein said drawing function unit is configured to not perform the drawing processing according to the control signal when the selection unit selects the third signal on which the second processing unit performs the frequency dispersion processing as the output signal.

4. The semiconductor device according to claim 1, further comprising a selection unit configured to select one of the first signal and the second signal on which the first processing unit performs the frequency dispersion processing or the third signal on which the second processing unit performs the frequency dispersion processing as the output signal according to a control signal; and
a drawing function unit configured to perform a drawing processing on the output signal according to the control signal when the selection unit selects the first signal on which the first processing unit performs the frequency dispersion processing as the output signal,
wherein said second output unit is configured to output the output signal on which the drawing function unit performs the drawing processing when the selection unit selects the first signal on which the first processing unit performs the frequency dispersion processing as the output signal, and
said second output unit is configured to output the output signal selected with the selection unit when the selection unit selects the second signal on which the first processing unit performs the frequency dispersion processing as the output signal or the third signal on which the second processing unit performs the frequency dispersion processing as the output signal.

5. The semiconductor device according to claim 4, wherein said drawing function unit is configured to not perform the drawing processing according to the control signal when the selection unit selects the second signal on which the first processing unit performs the frequency dispersion processing as the output signal or the third signal on which the second processing unit performs the frequency dispersion processing as the output signal.

6. The semiconductor device according to claim 2, wherein said first input unit is configured to receive a video signal of a vehicle mount camera mounted in a vehicle as the first signal, and
said selection unit is configured to select one of the first signal and the second signal on which the first processing unit performs the frequency dispersion processing or the third signal on which the second processing unit performs the frequency dispersion processing as the output signal according to the control signal including a signal output from the vehicle synchronizing with a predetermined operation of the vehicle.

7. The semiconductor device according to claim 2, wherein said first input unit is configured to receive a video signal captured with a back camera mounted in a vehicle as the first signal, and
said selection unit is configured to select one of the first signal and the second signal on which the first processing unit performs the frequency dispersion processing or the third signal on which the second processing unit performs the frequency dispersion processing as the output signal according to the control signal including a signal output from the vehicle when a back gear of the vehicle is set.

8. A video display system, comprising:
the semiconductor device according to claim 1;
the image processing unit configured to perform the image processing; and
the display unit configured to display an image according to the output signal output from the second output unit.

9. A method of processing a signal, comprising the steps of:
performing a frequency dispersion processing with a first processing unit on a first signal input from a first input unit and a second signal input from a second input unit;
outputting one of the first signal and the second signal or one of the first signal and the second signal on which the first processing unit performs the frequency dispersion processing with a first output unit;
receiving a third signal generated through performing a predetermined image processing with an image processing unit on one of the first signal and the second signal output from the first output unit with a third input unit;

performing the frequency dispersion processing on the third signal input from the third input unit with a second processing unit; and outputting an output signal selected from one of the first signal and the second signal on which the first processing unit performs the frequency dispersion processing or the third signal on which the second processing unit performs the frequency dispersion processing with a second output unit to a display unit.

* * * * *